(12) United States Patent
Zarati et al.

(10) Patent No.: US 11,840,338 B2
(45) Date of Patent: Dec. 12, 2023

(54) METHOD FOR MANAGING THE PROPULSIVE POWER OF AN AIRCRAFT

(71) Applicant: SAFRAN, Paris (FR)

(72) Inventors: Khaled Zarati, Moissy-Cramayel (FR); Panagiotis Giannakakis, Moissy-Cramayel (FR)

(73) Assignee: SAFRAN, Paris (FR)

( * ) Notice: Subject to any disclaimer, the term of this patent is extended or adjusted under 35 U.S.C. 154(b) by 524 days.

(21) Appl. No.: 17/263,119

(22) PCT Filed: Jul. 18, 2019

(86) PCT No.: PCT/EP2019/069321
§ 371 (c)(1),
(2) Date: Jan. 25, 2021

(87) PCT Pub. No.: WO2020/025332
PCT Pub. Date: Feb. 6, 2020

(65) Prior Publication Data
US 2021/0188455 A1    Jun. 24, 2021

(30) Foreign Application Priority Data

Aug. 1, 2018   (FR) ...................... 1857217

(51) Int. Cl.
*B64D 31/00*   (2006.01)
*B64D 31/12*   (2006.01)
(Continued)

(52) U.S. Cl.
CPC .............. *B64D 31/12* (2013.01); *B64C 21/06* (2013.01); *B64D 27/10* (2013.01); *B64D 27/24* (2013.01);
(Continued)

(58) Field of Classification Search
CPC ........ B64D 31/12; B64D 27/10; B64D 27/24; B64D 31/08; B64D 2027/026;
(Continued)

(56) References Cited

U.S. PATENT DOCUMENTS 7,735,774 B2 *  6/2010  Lugg ......................... B64C 3/10
                                                          244/45 R
2012/0209456 A1   8/2012  Harmon et al.
(Continued)

FOREIGN PATENT DOCUMENTS

EP        3326910 A1    5/2018

OTHER PUBLICATIONS

Search Report from French Intellectual Property Office on corresponding FR application (FR1857217) dated Feb. 12, 2019.
(Continued)

*Primary Examiner* — Ian Jen
(74) *Attorney, Agent, or Firm* — KOS IP Law LLP (57) ABSTRACT

A method for managing the propulsive power of an aircraft, the aircraft extending longitudinally along an axis X from the rear forwards and comprising at least two lateral propulsion systems each comprising a fan, each lateral propulsion system having a fan rotation speed N2 and at least one rear propulsion system configured to ingest a boundary layer
(Continued)

of said aircraft, the rear propulsion system comprising a fan having a fan rotation speed N3, the management system comprising, during a cruising phase P4, a step of adjusting the rotation speed N3 of the rear propulsion system according to the following formula N3=a*N2 in which a is a constant.

11 Claims, 5 Drawing Sheets

(51) Int. Cl.
  *B64C 21/06* (2023.01)
  *B64D 27/10* (2006.01)
  *B64D 27/24* (2006.01)
  *B64D 31/08* (2006.01)
  *B64D 27/02* (2006.01)

(52) U.S. Cl.
  CPC .......... *B64D 31/08* (2013.01); *B64C 2230/06* (2013.01); *B64D 2027/026* (2013.01)

(58) Field of Classification Search
  CPC ........ B64D 27/12; B64D 27/20; B64D 31/06; B64D 35/04; B64D 27/02; B64C 21/06; B64C 2230/06; B64C 2230/04; B64C 2230/28; Y02T 50/10; Y02T 50/60
  See application file for complete search history.

(56) References Cited

U.S. PATENT DOCUMENTS

2016/0355272 A1 12/2016 Moxon
2018/0118356 A1 5/2018 Armstrong et al.

OTHER PUBLICATIONS

International Search Report and Written Opinion on corresponding PCT application (PCT/EP2019/069321) from International Searching Authority (EPO) dated Oct. 1, 2019.
Jason Welstead et al.: "Conceptual Design of a Single-Aisle Turboelectric Commercial Transport with Fuselage Boundary Layer Ingestion", 54th AIAA Aerospace Sciences Meeting, Jan. 4, 2016, XP055554823, Reston, Virginia.
Patrick C. Vratny et al.: "Sizing Considerations of an Electric Ducted Fan for Hybrid Energy Aircraft", Transportation Research Procedia, vol. 29, Oct. 20, 2017, pp. 410-426, XP055554476, ISSN: 2352-1465.

* cited by examiner

METHOD FOR MANAGING THE PROPULSIVE POWER OF AN AIRCRAFT

TECHNICAL FIELD

The present invention relates to an aircraft comprising at least one lateral propulsion system and at least one rear propulsion system which is mounted at a rear point of the aircraft in order to ingest a boundary layer of the aircraft. The invention relates, more particularly, to a method for managing propulsion systems during the different phases of displacement of the aircraft.

In a known manner, an aircraft extends longitudinally along an axis and comprises lateral wings on which are mounted lateral propulsion systems, in particular, turbine engines. In order to increase the propulsion efficiency of an aircraft, it is known to mount a rear propulsion system at a rear point of the aircraft in order to ingest an air flow of the boundary layer of the aircraft. As a reminder, the boundary layer is formed at the surface of the fuselage. In a boundary layer, the maximum velocity of the air flow is equal to 99% of the free velocity. Consequently, the air flow of the boundary layer is displaced more slowly than the free air flow. Thus, when a rear propulsion system is configured to ingest the air flow of the boundary layer, the rear propulsion system generates an air flow with a lower exhaust velocity than the lateral propulsion systems placed under the wings of the aircraft and configured to absorb the flow of free air, which increases the efficiency of the rear propulsion system.

At present, the rear propulsion system is used at constant power in the different displacement phases (take off, idle on the ground and in flight, climb and cruise, etc.) in order to reduce the power of the lateral propulsion systems and thus limit the consumption of the aircraft.

In practice, the power supplied by the rear propulsion system may lead to disruptions of the lateral propulsion systems, which can lead to problems of operability as well as surge problems of the lateral propulsion systems. In actual fact, the greater the contribution of the rear propulsion system, the more important the aforementioned drawbacks.

The management of the power of a rear propulsion system is particularly complex given that it has to be, on the one hand, maximized to enable a reduction in the fuel consumption of the aircraft and, on the other hand, limited to reduce the risk of disruptions of the lateral propulsion systems.

The aim of the invention is to overcome these drawbacks by proposing a novel method for managing in an optimal manner the power of a rear propulsion system.

In an incidental manner, an entirely electrical architecture without thermal lateral systems is known from the patent application US2018/118356A1.

SUMMARY

To this end, the invention relates to a method for managing the propulsive power of an aircraft, the aircraft extending longitudinally along an axis X from the rear forwards and comprising at least two lateral propulsion systems each comprising a fan, each lateral propulsion system having a fan rotation speed $N_2$ and at least one rear propulsion system configured to ingest a boundary layer of said aircraft, the rear propulsion system comprising a fan having a fan rotation speed $N_3$.

The invention is remarkable in that it comprises, during a cruise phase P4, a step of adjusting the rotation speed $N_3$ of the rear propulsion system 3 according to the following formula:

$$N_3 = a^* N_2$$

in which a is a constant.

In an advantageous manner, during a cruise phase, the speed of the rear propulsion system $N_3$ is synchronized with the speed $N_2$ of the fans of the lateral propulsion systems, in such a way as to optimize the performances of the rear propulsion system and lateral propulsion systems.

In a preferred manner, the fan of a lateral propulsion system having a diameter d2, the fan of a rear propulsion system having a diameter d3, the method comprises, during a cruise phase P4, a step of adjusting the rotation speed $N_3$ of the rear propulsion system according to the following formula:

$$d_3 {}^* N_3 = b^* d_2 {}^* N_2$$

in which b is a constant comprised between 0.85 and 1.15.

In an advantageous manner, the head speeds of the fan blades are equal. A constant b comprised between 0.85 and 1.15 makes it possible to offer a power variation of 15% which is acceptable for conserving optimal performances. Preferably, the lateral propulsion systems are thermal in such a way as to produce thrust and electrical power. In a preferred manner, the lateral propulsion systems are in the form of turbine engines.

Further preferably, the method comprises during a climb phase P1 of the aircraft, a step of adjusting the rotation speed $N_3$ of the rear propulsion system to a first reference rotation speed $N_{S1}$ in such a way as to supply a first predetermined constant propulsive power $VP_1$.

In an advantageous manner, the propulsive power of the rear propulsion system is restrained to a power value $VP_1$ used during the climb phase P1. This is particularly advantageous to improve the lifetime of the rear propulsion system, in particular, when it comprises an electric motor, and the lifetime of the lateral propulsion systems, in particular, when they comprise current generators.

Preferably, the method comprises, during an idle phase P3, a step of adjusting the rotation speed $N_3$ of the rear propulsion system as a function of the rotation speed $N_2$ of the lateral propulsion systems wherein:
  if the rotation speed $N_2$ of the lateral propulsion systems multiplied by the constant a is less than the first reference rotation speed $N_{S1}$, the rotation speed $N_3$ of the rear propulsion system is adjusted in such a way as to be a function of the rotation speed $N_2$ of the lateral propulsion systems 2. In a preferred manner, the rotation speed $N_3$ of the rear propulsion system 3 is defined according to the formula $N_3 = a^* N_2$ described previously,
  if the rotation speed $N_2$ of the lateral propulsion systems multiplied by the constant a is greater than the first reference rotation speed $N_{S1}$, the rotation speed $N_3$ of the rear propulsion system is equal to the first reference rotation speed $N_{S1}$.

In an advantageous manner, during an idle phase, the speed of the rear propulsion system $N_3$ is synchronized with the speed $N_2$ of the fans of the lateral propulsion systems, in such a way as to optimize the performances of the rear propulsion system and the lateral propulsion systems. In a preferred manner, the method comprises, during a take-off phase P2, a step of adjusting the rotation speed $N_3$ of the rear propulsion system to a second reference rotation speed $N_{S2}$ in such a way as to supply a second predetermined propulsive power $VP_2$ strictly greater than the first predetermined propulsive power $VP_1$.

During the take-off phase, it is important to supply an important propulsive thrust. In an advantageous manner, the rear propulsion system is used at high speed in order to limit the fuel consumption of the lateral propulsion systems during the take-off phase and in order to limit problems of surges of the lateral propulsion systems.

In a preferred manner, the second predetermined propulsive power $VP_2$ is defined according to the following formula:

$$V_{p2} = V_{p1} + F1$$

in which F1 is a positive adaptation function which notably depends on the altitude and the speed of the aircraft.

Thus, the rear propulsive power is increased compared to the value $VP_1$ as a function of the flight conditions of the aircraft, in order to prevent any surge phenomenon in the lateral propulsion systems. Further preferably, the positive adaptation function is also a function of the position of the control lever and the ambient temperature.

According to an aspect of the invention, the rear propulsion system comprises at least one fan driven by an electric motor. An electrically supplied rear propulsion system makes it possible to limit fuel consumption. Preferably, the electric motor is supplied by at least one generator taking mechanical torque from a shaft, notably low pressure, of one of the lateral propulsion systems.

In a preferred manner, the first propulsive power $VP_1$ is predetermined as a function of the continuous maximum power of the electric motor of the rear propulsion system. In an advantageous manner, the first propulsive power $VP_1$ is determined to maximize the ingestion of the boundary layer of the fuselage and to optimize fuel consumption.

According to an aspect of the invention, the management method comprises, in the event of breakdown of one of the lateral propulsion systems, a step of adjusting the rotation speed $N_3$ of the rear propulsion system in such a way as to be equal to a third reference rotation speed $N_{S3}$ in order to supply half of the first predetermined propulsive power $V_{P1}$.

Given that only one of the lateral propulsion systems is operational, the propulsive power of the rear propulsion system is decreased by 50% in order not to cause the surcharge of the only lateral propulsion system which is operational.

Preferably, outside of the cruise phase, the rotation speed $N_3$ of the rear propulsion system is determined as follows $N_3 \leq a*N_2$ in such a way as to obtain optimal performances. This makes it possible to adapt the rotation speed of the rear propulsion system as a function of the specific constraints linked to the climb, the idle and the take off.

Preferably, each lateral propulsion system comprising at least one bleed valve, the method comprises, in the event of breakdown of the rear propulsion system, a step of opening the bleed valves of the lateral propulsion systems. The absence of rear propulsion causes a strong compression in the low pressure compressors of the lateral propulsion systems. The opening of the bleed valves makes it possible to limit the pressure and thus to avoid a surge phenomenon of the low pressure compressors of the lateral propulsion systems.

The invention also relates to a computer program comprising instructions for the execution of the steps of a management method such as described previously when said program is executed by a computer.

The invention further relates to an electronic unit for aircraft comprising a memory comprising instructions of a computer program such as described previously. Finally, the invention also relates to an electronic unit such as described previously.

BRIEF DESCRIPTION OF THE DRAWINGS

The invention will be better understood on reading the description that follows, given uniquely as an example, and by referring to the appended drawings in which.

It should be noted that the figures set out the invention in a detailed manner for implementing the invention, said figures obviously being able to serve to better define the invention if need be.

DETAILED DESCRIPTION

Figure 1:
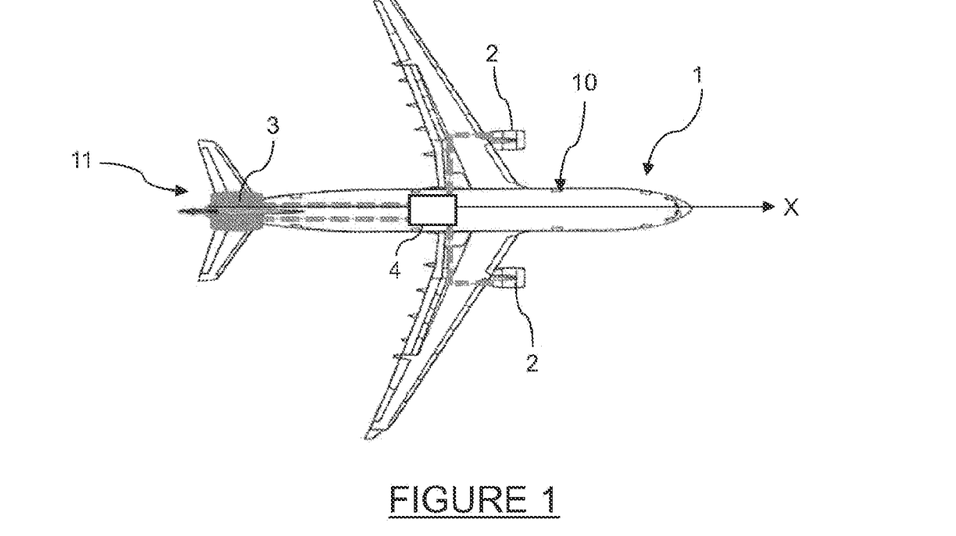
FIG. 1 is a schematic representation of an aircraft with a rear propulsion system according to the invention.

With reference to FIG. 1, an aircraft 1 is represented extending longitudinally along an axis X and comprising lateral wings on which are mounted lateral propulsion systems 2, in particular, thermal systems such as turbine engines. Such a thermal lateral propulsion system 2 makes it possible to generate thrust. In a preferred manner, the lateral propulsion system is a dual flow turbine engine. It comprises in a preferred manner a low pressure compressor, a high pressure compressor, a low pressure turbine and a high pressure turbine.

In order to increase the propulsion efficiency of an aircraft, the aircraft 1 further comprises a rear point 11 on which is mounted a rear propulsion system 3 in order to ingest an air flow of the boundary layer of the aircraft 1. As a reminder, the boundary layer is formed at the surface of the fuselage. In a boundary layer, the maximum velocity of the air flow is equal to 99% of the free velocity. Consequently, the air flow of the boundary layer is displaced more slowly than the free air flow. Thus, when a rear propulsion system 3 is configured to ingest the air flow of the boundary layer, the rear propulsion system 3 generates an air flow with a lower escape velocity than the lateral propulsion systems 2 placed under the wings of the aircraft and configured to absorb the free air flow, which increases the efficiency of the rear propulsion system 3. Subsequently, each lateral propulsion system 2 has a rotation speed $N_2$. In this example, each lateral propulsion system 2 comprises a fan and the rotation speed $N_2$ corresponds to the fan speed $N_2$. In a preferred manner, the fan is rotationally integral with the low pressure compressor.

The rotation speeds $N_2$ of the two lateral propulsion systems 2 are equal. As will be described hereafter, each lateral propulsion system 2 comprises at least one bleed valve configured to discharge the air situated in a compression stage of a lateral propulsion system 2. In an analogous manner, the rear propulsion system 3 has a rotation speed $N_3$. In this example, the rear propulsion system 3 comprises a fan and the rotation speed $N_3$ corresponds to the fan speed $N_3$. In this example, the aircraft 1 further comprises an electronic unit 4 connected to the lateral propulsion systems 2 and to the rear propulsion system 3 in order to control their respective speeds $N_2$, $N_3$. The electronic unit 4 is in the form of an electronic card receiving different information and measurements of the aircraft 10 and the propulsion systems 2, 3.

Figure 2:
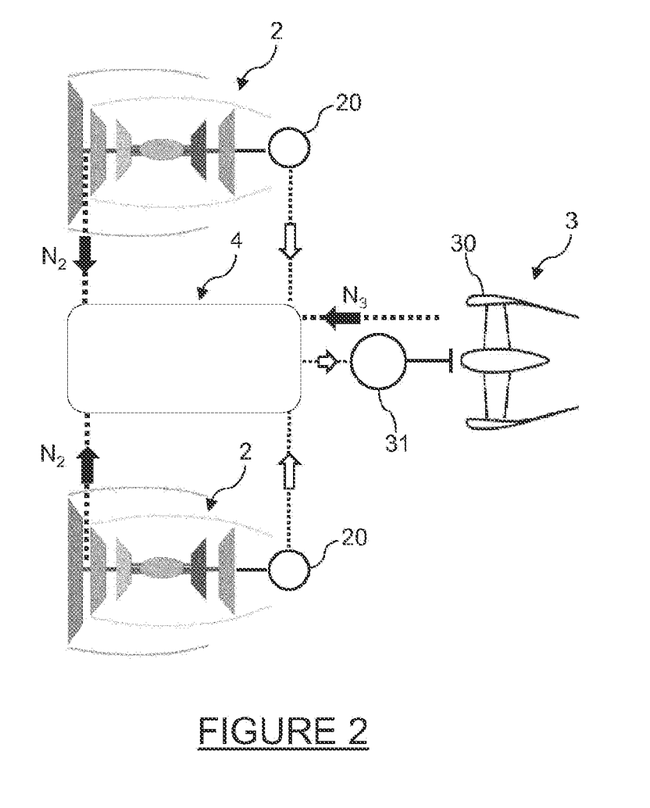
FIG. 2 is a schematic representation of propulsion systems and an electronic unit.

In this exemplary embodiment, with reference to FIG. 2, the rear propulsion system 3 comprises a fan 30 which is driven by an electric motor 31 which is itself controlled by the electronic unit 4. A rear propulsion system 3 makes it possible to supply thrust while limiting fuel consumption, which is advantageous. In a preferred manner, the electric motor 31 is supplied by one or more electrical generators 20 which take mechanical power from the lateral propulsion systems 2. For a lateral propulsion system 2 being in the form of a double-body turbomachine comprising a low pressure shaft and a high pressure shaft, mechanical power is preferably taken from the low pressure shaft.

An exemplary embodiment of a method for managing the propulsive power of an aircraft 1 according to different phases of displacement of the aircraft 1 will henceforth be described. In this example, the management method is implemented by the electronic unit 4.

In particular, as is described hereafter, the management method aims to adjust the propulsive power $P_3$ of the rear propulsion system 3 by adjusting the rotation speed $N_3$ of the rear propulsion system 3 according to the displacement phase of the aircraft 1 and as a function of the rotation speed $N_2$ of the lateral propulsion systems 2.

The electronic unit 4 measures in real time the value of the rotation speeds $N_2$, $N_3$ of the lateral propulsion systems 2, 3. Moreover, the electronic unit 4 determines the displacement phase of the aircraft 1 as a function of different parameters of the aircraft 1, in particular, the altitude, the position of the throttle lever controlling the lateral propulsion systems 2, the speed of the aircraft and the ambient temperature, etc. Thus, the electronic unit 4 makes it possible to detect the transition from one displacement phase to another. In an advantageous manner, the electronic unit 4 can modify the value of the rotation speed $N_3$ of the rear propulsion system 3 in an optimal manner as a function of the displacement phase of the aircraft 1. In this exemplary embodiment, the electronic unit 4 comprises a memory 40 in which are stored parameters.

A management of the propulsive power will henceforth be described according to the following displacement phases: a climb phase P1, a take-off phase P2, an idle phase P3 and a cruise phase P4.

In this exemplary embodiment, the rotation speed $N_3$ of the rear propulsion system 3 is determined as a function of the rotation speed $N_2$ of the two lateral propulsion systems 2.

Figure 3:
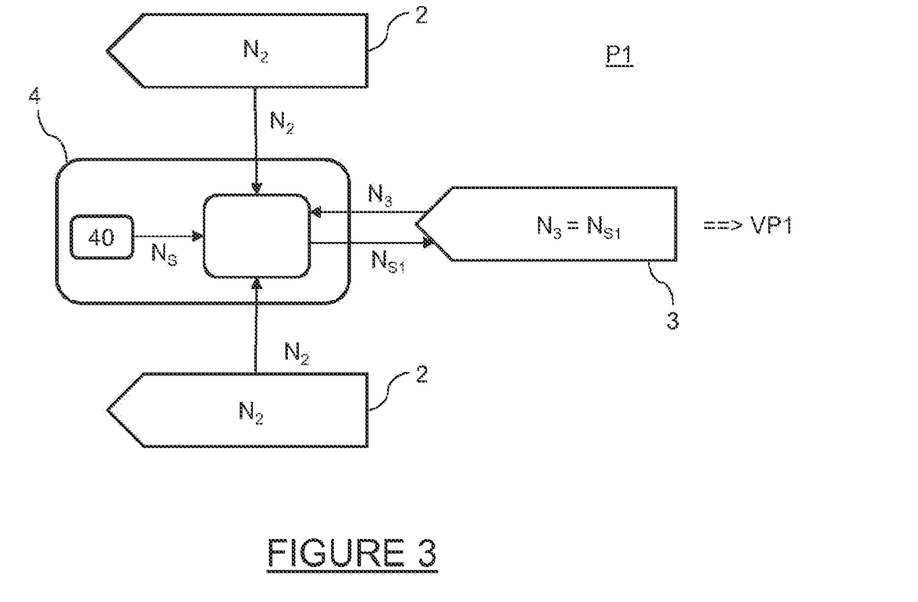
FIG. 3 represents a functional block diagram of the climb phase of the management method according to the invention.

With reference to FIG. 3, during a climb phase P1, the electronic unit 4 adjusts the rotation speed $N_3$ of the rear propulsion system 3 in such a way that it is equal to a first reference rotation speed $N_{S1}$ in such a way as to supply a first predetermined propulsive power $VP_1$. The first reference rotation speed $N_{S1}$ is predetermined and stored in a memory of the electronic unit 4. Preferably, the first reference rotation speed $N_{S1}$ is a function of the altitude, the flight speed and the ambient temperature. In practice, for a first predetermined propulsive power $VP_1$, the first reference rotation speed $N_{S1}$ varies as a function of the flight conditions.

Thus, during the climb phase P1, the first predetermined propulsive power $V_{P1}$ does not depend on the rotation speed $N_2$ of the lateral propulsion system 2. In a preferred manner, the first propulsive power $VP_1$ is determined in such a way as to correspond to the maximum continuous power of the electric motor 30 of the rear propulsion system 3. This advantageously makes it possible to use the rear propulsion system 3 in order to ingest a maximum of boundary layer and to minimize fuel consumption.

Figure 4:
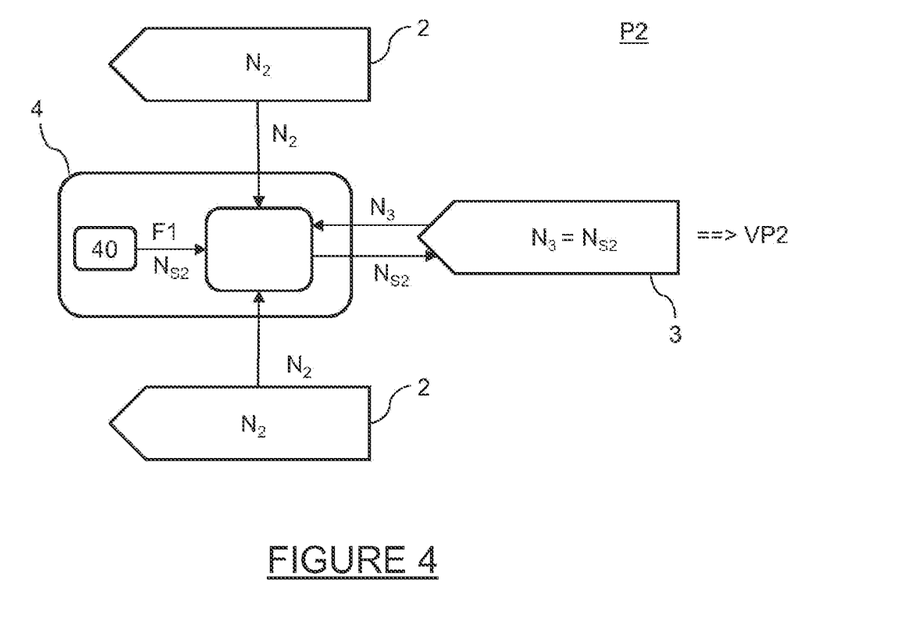
FIG. 4 represents a functional block diagram of the take-off phase of the management method according to the invention.

With reference to FIG. 4, during a take-off phase P2, the electronic unit 4 adjusts the rotation speed $N_3$ of the rear propulsion system 3 in such a way as to be equal to a second reference rotation speed $N_{S2}$ in such a way as to supply a second predetermined propulsive power $VP_2$. The second reference rotation speed $N_{S2}$ is predetermined and stored in the memory 40 of the electronic unit 4. In a preferred manner, the second reference rotation speed $N_{S2}$ is a function of the altitude, the flight speed and the ambient temperature. For the same flight conditions, the second reference rotation speed $N_{S2}$ is strictly greater than the first reference rotation speed $N_{S1}$ in such a way that the second predetermined propulsive power $V_{P2}$ is strictly greater than the first predetermined propulsive power $V_{P1}$. In practice, the second reference rotation speed $N_{S2}$ varies as a function of the flight conditions.

Indeed, in the take-off phase P2, the aircraft 1 requires an important propulsive power. The important use of the rear propulsion system 3 makes it possible to limit the fuel consumption of the lateral propulsion systems 2 and to prevent any surge phenomenon in the lateral propulsion systems 2.

In a preferred manner, the second propulsive power $V_{P2}$ is determined according to the following formula: $V_{p2}=V_{p1}+F1$ in which F1 is a positive adaptation function that depends on the altitude of the aircraft, the speed the aircraft, the position of the control lever and the ambient temperature. In this example, the adaptation function F1 is stored in the memory 40 of the electronic unit 4.

Figure 8:
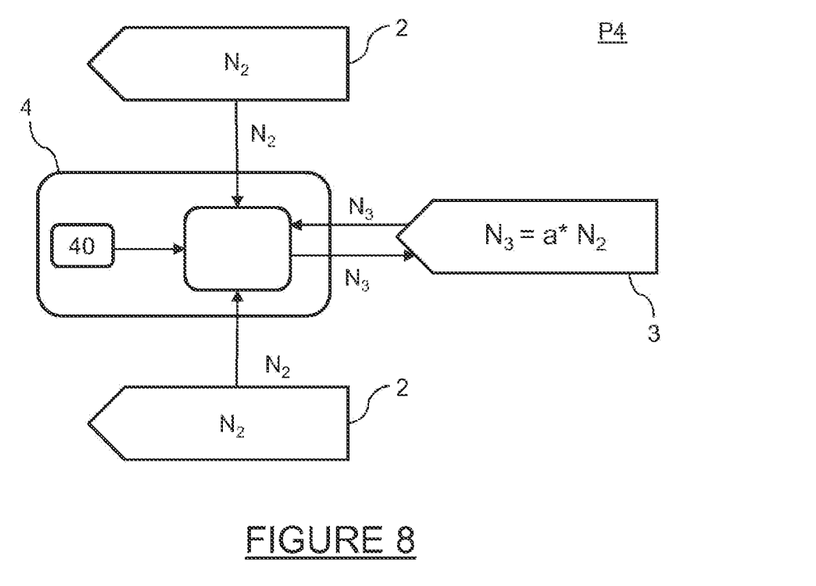
FIG. 8 is a representation of a functional block diagram of the cruise phase of the management method according to the invention.

During the take-off phase P2, the rear propulsion system 3 is highly loaded for a short period. Finally, with reference to FIG. 8, during a cruise phase P4, the electronic unit 4 adjusts the rotation speed $N_3$ of the rear propulsion system 3 according to the following formula:

$$N_3=a*N_2$$

in which a is a constant.

In a preferred manner, the fan of a lateral propulsion system 2 having a diameter d2 and the fan of a rear propulsion system 3 having a diameter d3, the method comprises a step of adjusting the rotation speed $N_3$ of the rear propulsion system 3 according to the following formula:

$$d_3*N_3=b*d_2*N_2$$

in which b is a constant comprised between 0.85 and 1.15.

Thus, according to the invention, the head speeds of the fan blades are substantially equal. This enables optimal dimensioning of the propulsion systems.

In an advantageous manner, during the cruise phase P4, the rear propulsion system 3 is used in such a way as to optimize both its efficiency and the performances of the lateral propulsion systems 2. The rotation speed $N_3$ is synchronized with the rotation speed $N_2$ in order to optimize the performances.

Figure 5:
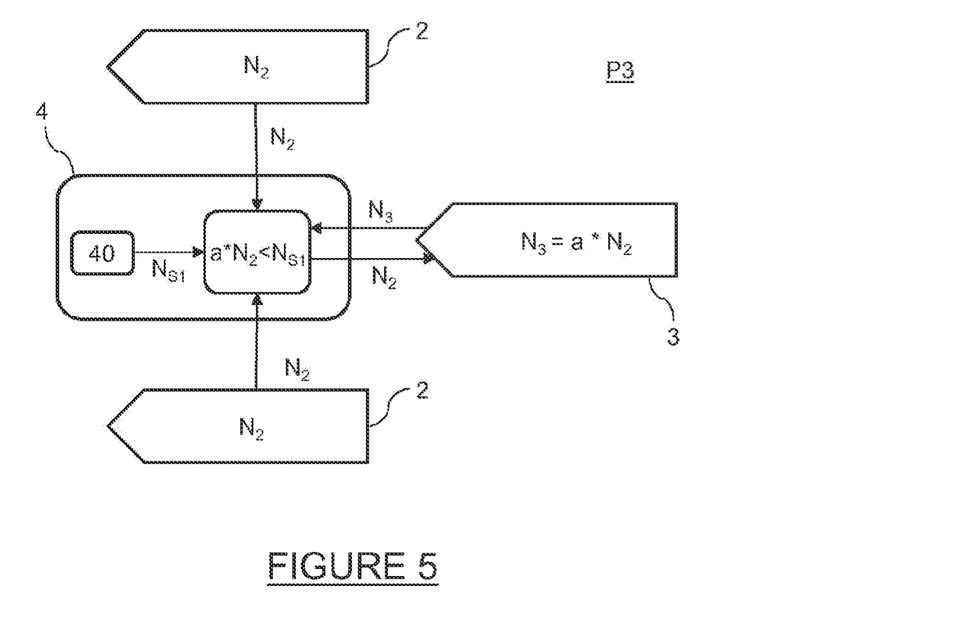
FIGS. 5 and 6 represent a functional block diagram of the idle phase of the management method according to the invention.

With reference to FIG. 5, during an idle phase P3, the electronic unit 4 adjusts the rotation speed $N_3$ of the rear propulsion system 3 as a function of the rotation speed $N_2$ of the lateral propulsion system 2. Idle phase P3 is taken to mean not just an idle phase on the ground but also an idle phase in flight.

Figure 7:
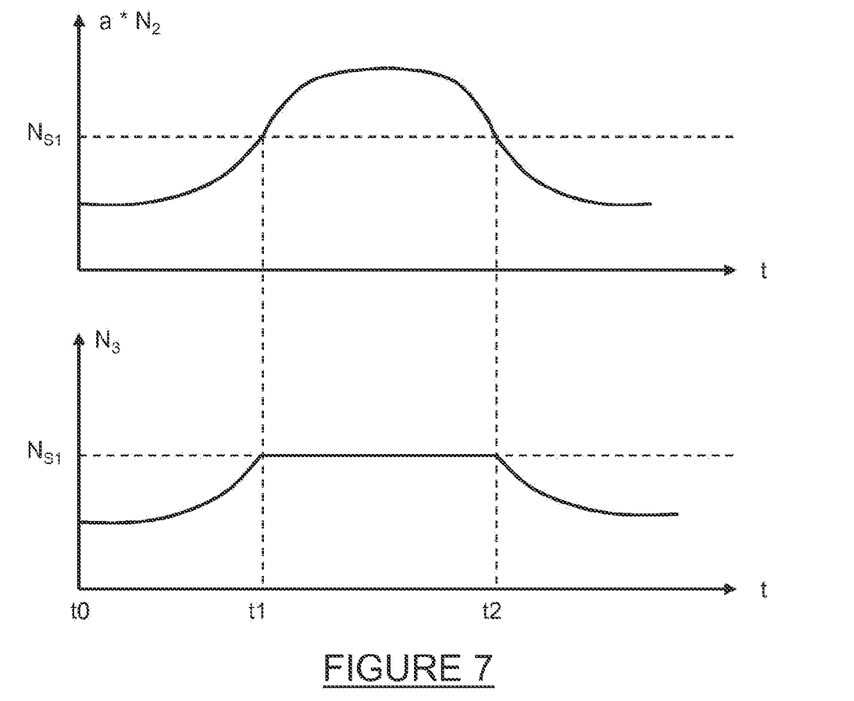
FIG. 7 represents the variation in the rotation speed of the rear propulsion system as a function of the rotation speed of the lateral propulsion system during the idle phase for constant flight conditions.

As an example, FIG. 7 is a schematic representation of an idle phase during which the flight conditions do not change. With reference to FIGS. 5 and 7, if the rotation speed $N_2$ of the lateral propulsion systems 2 multiplied by the constant a is less than the first reference rotation speed $N_{S1}$ ($a*N_2<N_{S1}$), the rotation speed $N_3$ of the rear propulsion system 3 is adjusted in such a way as to be a function of the rotation speed $N_2$ of the lateral propulsion systems 2. In a preferred manner, the rotation speed $N_3$ of the rear propulsion system 3 is defined according to the formula $N_3=a*N_2$ described previously.

Thus, the rear propulsion system 3 delivers a propulsive power less than the first predetermined propulsive power $V_{P1}$ and adapts to the power of the lateral propulsion systems 2 to obtain optimal performances.

Figure 6:
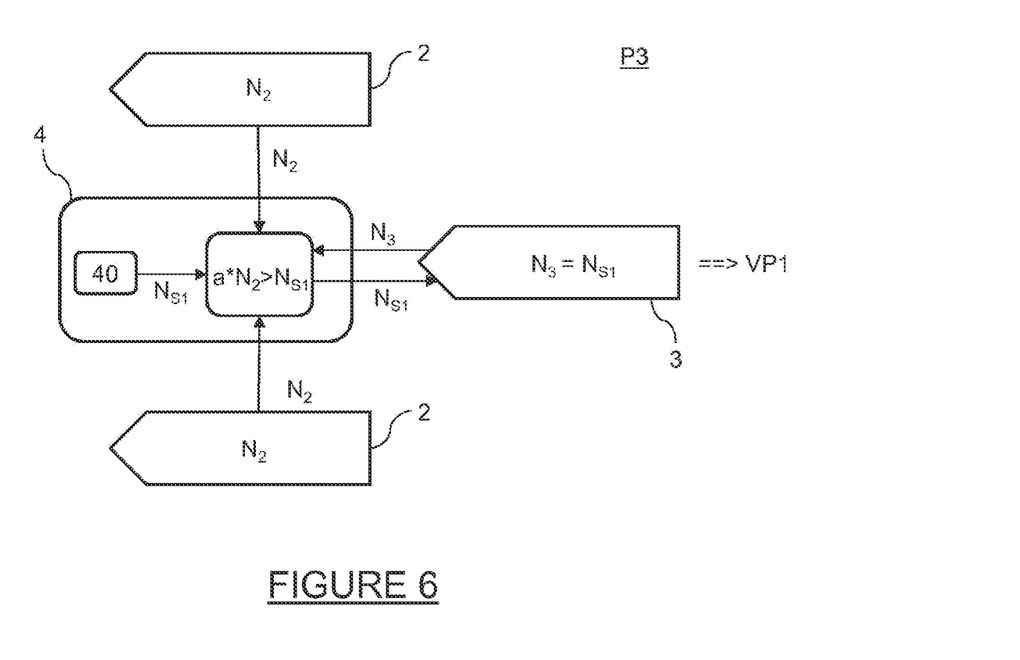

Conversely, with reference to FIGS. 6 and 7, if the rotation speed $N_2$ of the lateral propulsion systems 2 multiplied by the constant a is greater than the first reference rotation speed $N_{S1}$ ($a*N_2>N_{S1}$), then the rotation speed $N_3$ of the rear propulsion system 3 is equal to the first reference rotation speed $N_{S1}$. Thus, the rear propulsion system 3 delivers a propulsive power that is limited to the first predetermined propulsive power $V_{P1}$. According to the management method, the rotation speed $N_3$ of the rear propulsion system 3 is restrained in such a way as to avoid the operating limits of the rear propulsion system 3 being exceeded. Moreover, this makes it possible to avoid the rear propulsion system 3 from operating outside of its high-efficiency range, which is advantageous.

With reference to FIG. 7 representing a theoretical case with constant flight conditions, over the period t0-t1, when the speed $N_2$ of the lateral propulsion systems 2 multiplied by the constant a is less than the first reference rotation speed $N_{S1}$ ($a*N_2<N_{S1}$), the rotation speed $N_3$ of the rear propulsion system 3 is adjusted in such a way as to be a function of the rotation speed $N_2$ of the lateral propulsion systems 2. In a preferred manner, the rotation speed $N_3$ of the rear propulsion system 3 is defined according to the formula $N_3=a*N_2$ described previously. Over the period t1-t2, when the rotation speed $N_2$ of the lateral propulsion systems 2 multiplied by the constant a is greater than the first reference rotation speed $N_{S1}$ ($a*N_2>N_{S1}$), the rotation speed $N_3$ of the rear propulsion system 3 is equal to the first reference rotation speed $N_{S1}$.

In FIG. 7, the first reference rotation speed $N_{S1}$ is constant but it goes without saying that it could be variable as a function of the flight conditions.

Figure 9:
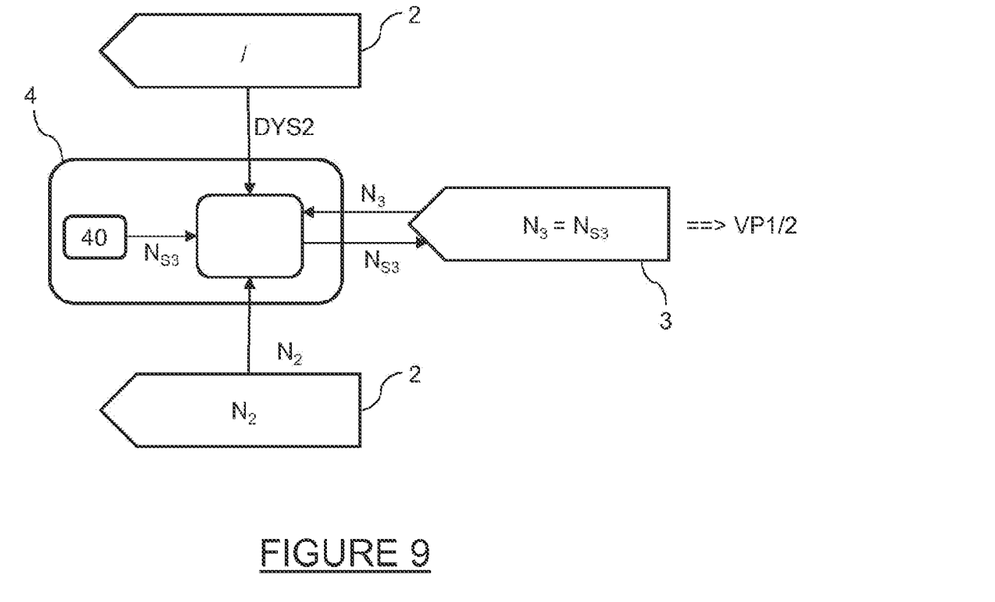
FIG. 9 is a representation of a functional block diagram of the management method according to the invention in the event of breakdown of a lateral propulsion system.

With reference to FIG. 9, the management method also makes it possible to treat critical cases of breakdown of one of the lateral propulsion systems 2. Indeed, during a breakdown of one of the lateral propulsion systems 2, the electronic unit 4 adjusts the rotation speed $N_3$ of the rear propulsion system 3 in such a way as to be equal to a third reference rotation speed $N_{S3}$ in order to supply half of the first predetermined propulsive power $V_{P1}$. In this example, the third reference rotation speed $N_{S3}$ is notably a function of the altitude, the flight speed and the ambient temperature.

In practice, the electronic unit 4 measures a dysfunction DYS2 of one of the lateral propulsion systems 2 and transmits a rotation speed instruction $N_{S3}$ to the rear propulsion system 3 as illustrated in FIG. 9 in order to supply half of the first predetermined propulsive power $V_{P1}$. In other words, the rear propulsion system 3 decreases its influence in order to avoid supplying a greater propulsive power than that which the lateral propulsion system 2 which is in operation is capable of supplying. Given that 50% of the lateral propulsive power is prevented on account of the breakdown of one of the lateral propulsion systems 2, the rear propulsive power 3 may be decreased in a proportional manner in order to guarantee optimal operation.

Figure 10:
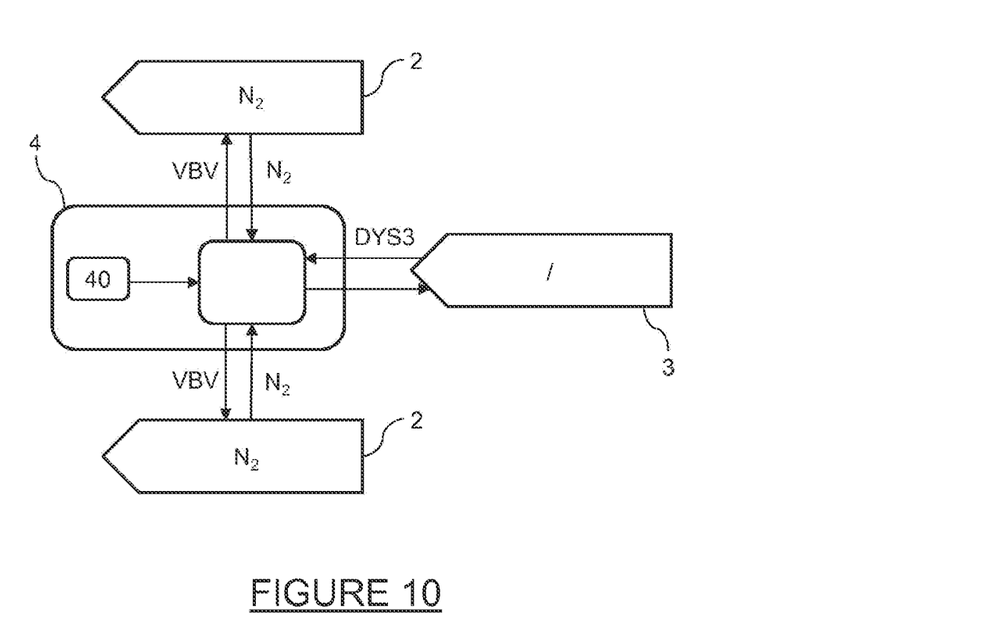
FIG. 10 is a representation of a functional block diagram of the management method according to the invention in the event of breakdown of a rear propulsion system.

With reference to FIG. 10, said management method also makes it possible to treat the critical case of breakdown of the rear propulsion system 3. In the present case, during a breakdown of the rear propulsion system 3, the electronic unit 4 imposes the opening of the bleed valves of the lateral propulsion systems 2 in order to avoid the appearance of a surge phenomenon. The bleed valves, known by the person skilled in the art as "variable bleed valves" advantageously make it possible to avoid air overpressures inside the compressor of a turbomachine of a lateral propulsion system 2 while outwardly venting a quantity of air liable to cause a surge. In practice, the electronic unit 4 measures a dysfunction DYS3 and transmits an instruction to open the bleed valves VBV of the lateral propulsion systems 2 as illustrated in FIG. 10.

Thanks to the invention, the different propulsion systems 2, 3 are managed in an optimal manner for any displacement phase.

Outside of the cruise phase P4, the rotation speed $N_3$ of the rear propulsion system 3 is determined as follows $N_3 \leq a*N_2$ in such a way as to obtain optimal performances, in particular, vis-à-vis the first predetermined propulsive power $VP_1$ for the climb P1 and the idle P3 and vis-à-vis the second predetermined propulsive power $V_{P2}$ for the take-off phase P2.

The invention claimed is:

1. A method for managing the propulsive power of an aircraft, the aircraft extending longitudinally along an axis X from the rear forwards and comprising at least two thermal lateral propulsion systems each comprising a fan, each lateral propulsion system having a fan rotation speed N2 and at least one rear propulsion system configured to ingest a boundary layer of said aircraft, the rear propulsion system comprising a fan having a fan rotation speed N3, management method wherein, during a cruise phase P4, a step of adjusting the rotation speed N3 of the rear propulsion system according to the following formula:

$$N_3=a*N_2$$

in which a is a constant.

2. The management method according to claim 1, wherein, the fan of a lateral propulsion system having a diameter d2, the fan of a rear propulsion system having a diameter d3, the method comprises, during a cruise phase P4, a step of adjusting the rotation speed N3 of the rear propulsion system according to the following formula:

$$d_3 * N_3 = b * d_2 * N_2$$

in which b is a constant comprised between 0.85 and 1.15.

3. The management method according to claim 1, comprising, during a climb phase P1 of the aircraft, a step of adjusting the rotation speed $N_3$ of the rear propulsion system to a first reference rotation speed $N_{S1}$ in such a way as to supply a first predetermined constant propulsive power $VP_1$.

4. The management method according to claim 3, comprising, during an idle phase P3, a step of adjusting the rotation speed $N_3$ of the rear propulsion system as a function of the rotation speed $N_2$ of the lateral propulsion systems wherein:

if the rotation speed $N_2$ of the lateral propulsion systems multiplied by the constant a is less than the first reference rotation speed $N_{S1}$, the rotation speed $N_3$ of the rear propulsion system is adjusted according to the following formula:

$$N_3 = a * N_2$$

if the rotation speed $N_2$ of the lateral propulsion systems multiplied by the constant a is greater than the first reference rotation speed $N_{S1}$, the rotation speed $N_3$ of the rear propulsion system is equal to the first reference rotation speed $N_{S1}$.

5. The management method according to claim 3, comprising during a take-off phase P2, a step of adjusting the rotation speed $N_3$ of the rear propulsion system to a second reference rotation speed $N_{S2}$ in such a way as to supply a second predetermined propulsive power $VP_2$ strictly greater than the first predetermined propulsive power $VP_1$.

6. The management method according to claim 5, wherein the second predetermined propulsive power $VP_2$ is defined according to the following formula:

$$V_{p2} = V_{p1} + F1$$

in which F1 is a positive adaptation function which depends notably on the altitude and the speed of the aircraft.

7. The management method according to claim 3, wherein the rear propulsion system comprising at least one fan driven by an electric motor, the first propulsive power is predetermined as a function of the continuous maximum power of the electric motor of the rear propulsion system.

8. The management method according to claim 3, comprising:

in the event of breakdown of one of the lateral propulsion systems, a step of adjusting the rotation speed $N_3$ of the rear propulsion system in such a way as to be equal to a third reference rotation speed $N_{S3}$ in order to supply half of the first predetermined propulsive power $V_{P1}$.

9. The management method according to claim 1, wherein each lateral propulsion system comprising at least one bleed valve, the method comprising:

in the event of breakdown of the rear propulsion system, a step of opening the bleed valves of the lateral propulsion systems.

10. The management method according to claim 1, wherein outside of the cruise phase, the rotation speed $N_3$ of the rear propulsion system is defined according to the following formula $N_3 \leq a * N_2$.

11. A computer program comprising instructions for the execution of the steps of the management method according to claim 1 when said program is executed by the computer.

* * * * *